(12) United States Patent
Terzian et al.

(10) Patent No.: US 7,719,145 B2
(45) Date of Patent: *May 18, 2010

(54) ENHANCED INTERNAL ELECTRICAL GENERATORS

(75) Inventors: Berj A. Terzian, Newbury, MA (US); Jack A. Ekchian, Belmont, MA (US)

(73) Assignee: Trixcel, LLP, Newbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/353,696

(22) Filed: Jan. 14, 2009

(65) Prior Publication Data

US 2009/0140529 A1    Jun. 4, 2009

Related U.S. Application Data

(62) Division of application No. 11/199,309, filed on Aug. 8, 2002, now Pat. No. 7,482,718.

(51) Int. Cl.
*H02K 35/00* (2006.01)
*H02J 7/00* (2006.01)

(52) U.S. Cl. .............................. 310/37; 310/36; 310/38; 320/107; 320/123

(58) Field of Classification Search .................... 310/36, 310/37, 38; 320/107, 123
See application file for complete search history.

(56) References Cited

U.S. PATENT DOCUMENTS

| | | | |
|---|---|---|---|
| 3,204,110 A | 8/1965 | Yoshio | |
| 3,231,749 A * | 1/1966 | Hinck, III | 290/53 |
| 4,260,901 A * | 4/1981 | Woodbridge | 290/42 |
| 4,423,334 A | 12/1983 | Jacobi et al. | |
| 4,821,218 A | 4/1989 | Potsch | |
| 5,271,328 A | 12/1993 | Boulais et al. | |
| 5,347,186 A * | 9/1994 | Konotchick | 310/17 |
| 5,941,692 A | 8/1999 | Olney et al. | |
| 5,949,215 A * | 9/1999 | Takakura | 320/114 |
| 6,020,653 A | 2/2000 | Woodbridge et al. | |
| 6,172,426 B1 | 1/2001 | Galich | |
| 6,242,827 B1 * | 6/2001 | Wolf et al. | 310/74 |
| 6,316,906 B1 * | 11/2001 | Lozada | 320/101 |
| 6,791,205 B2 * | 9/2004 | Woodbridge | 290/53 |
| 6,914,340 B2 * | 7/2005 | Becker et al. | 290/1 R |
| 6,940,200 B2 | 9/2005 | Lopatinsky et al. | |
| 2004/0222637 A1 | 11/2004 | Bedyak | |
| 2004/0222638 A1 | 11/2004 | Bedyak | |

* cited by examiner

*Primary Examiner*—Edward Tso
*Assistant Examiner*—Richard V Muralidar
(74) *Attorney, Agent, or Firm*—Lucas & Mercanti, LLP

(57) ABSTRACT

Enhanced internal electrical generators are provided which include pole pieces that form air gaps flanked with conductive wire coils. Rotatable armatures supporting permanent magnets are arranged to swing or revolve relative to the air gaps such that the magnetic flux thereof is intersected by the wire coils to generate electrical voltage and current therein. These generators may be incorporated within the housing of many portable devices such as cell phones to self generate electrical current useful for operating the device or recharging its batteries or other component that stores the generated electrical energy.

8 Claims, 2 Drawing Sheets

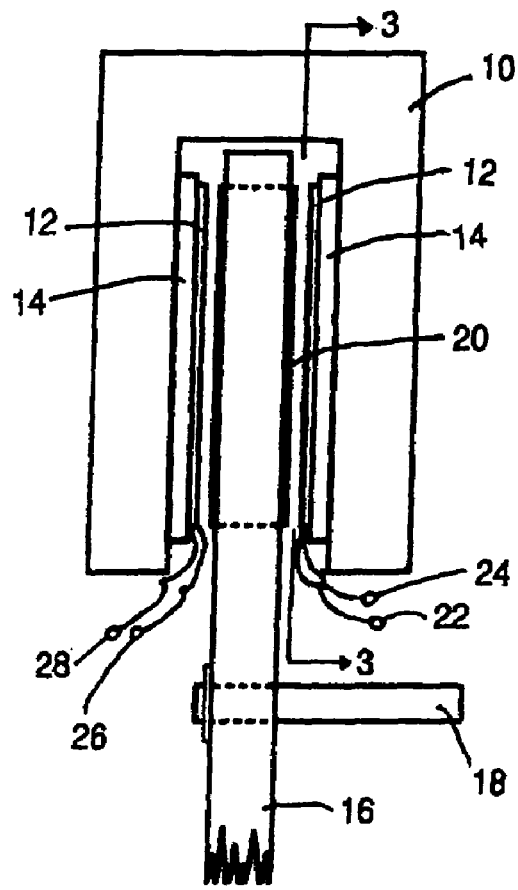
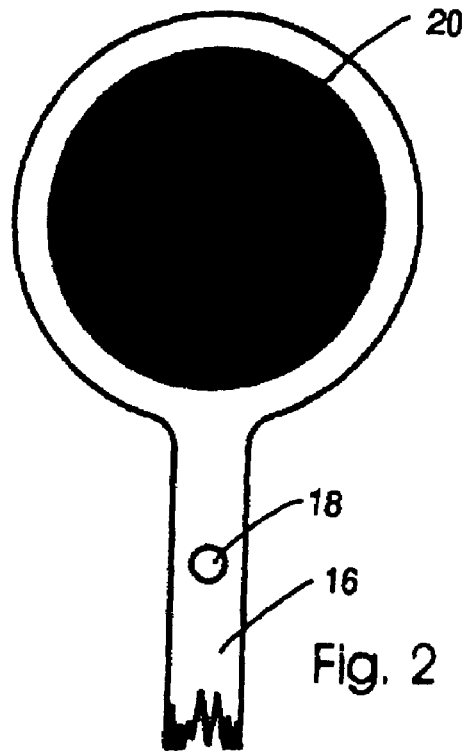
Fig. 2
Fig. 1
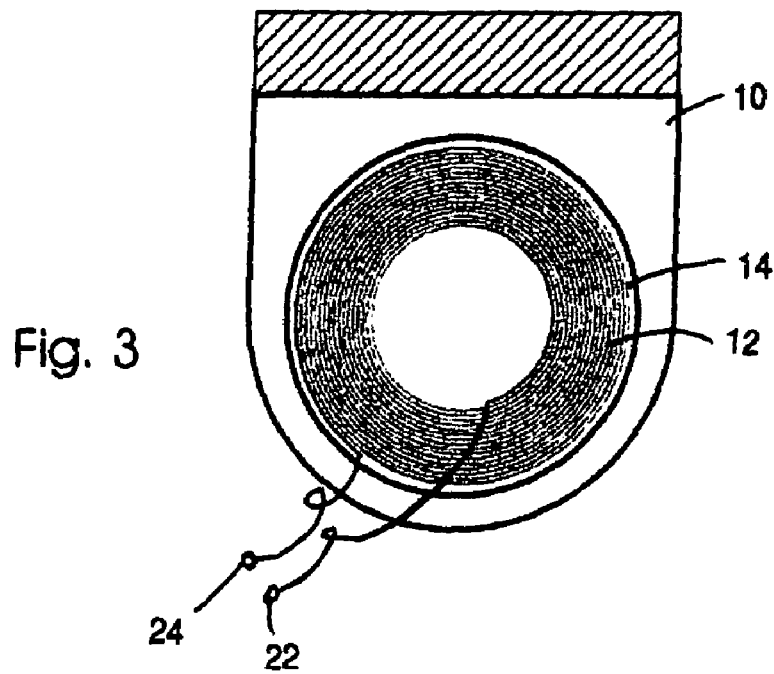
Fig. 3

ENHANCED INTERNAL ELECTRICAL GENERATORS

CROSS REFERENCE TO RELATED APPLICATIONS

This Application is a Divisional Application of U.S. application Ser. No. 11/199,309 filed Aug. 8, 2005, now U.S. Pat. No. 7,482,718, issued Jan. 27, 2009, the priority of which is claimed and the contents of which are incorporated herein by reference.

BACKGROUND OF INVENTION

1. Field of Invention

This invention relates to armature type electrical generators which are useful as internal power sources for self powered cell phones or other battery or capacitor powered products or devices. Installation of such generators within the housing of such self powered devices avoids the need for power from an electric outlet to perform operating or recharging functions.

2. Disadvantages in Prior Practice

The present applicants are co-inventors of an invention described in their earlier filed copending application Ser. No. 11/191,890, entitled ARMATURE TYPE ELECTRICAL GENERATORS FOR SELF POWERED CELL PHONES, the disclosure of which is incorporated herein by reference. Generally, that application teaches an internal electrical generator having a pivotable armature which supports one or more conductive wire coils. Such coils are arranged to oscillate in reciprocal opposite directions like a pendulum, through the flux of permanent magnetic circuits and thereby generate electrical voltage and current by the Faraday Effect.

The output of the wire coils is connected to leads that conduct the generated current to the input terminals of a battery or capacitor or other component that stores the electrical energy. Since the output ends emerge from coils that oscillate in sizable arcs with the pivoting armature, the connectors have to be made of conductive material that can flex with and withstand such oscillations without breakage or other failure. Furthermore, in view of such connections, the armature cannot be put into complete angular revolutions of 360 degrees because the connectors would then twist about themselves and either jam the armature or break apart, thereby disabling or destroying the function of current generation. These limitations are obstacles which prevent designing internal electrical generators that operate with optimum efficiency and cost effectiveness.

SUMMARY OF INVENTION

The present invention overcomes the above discussed drawbacks of the earlier described technology by applying a modification which exchanges two of the operating components of the previous designs. In particular, in the present invention, conductive wire coils are affixed to pole pieces of magnetic circuits and define air gaps that can be bridged by the flux of permanent magnets supported on a pivotable, fully rotatable armature. As the armature swings or rotates through the air gaps, the flux of the magnets supported on the armature intersects the wire coils to generate electrical voltage and current in the coils. Since the coils are not physically connected to, and do not move with, the armature, flexible connectors leading from the output ends of the coils to leads that conduct current to the input terminals of storage components are unnecessary. Furthermore, the magnets supported on the armature can be put into continuous rotation through the air gaps flanked by the wire coils, thus enabling optimum generation of electrical energy therein.

BRIEF DESCRIPTIONS OF THE DRAWINGS

Further details of the invention will be readily understood by reference to the accompanying drawings and description, wherein:

FIG. 1 is a side view of one embodiment of a rotatable armature supporting a permanent magnet disposed within an air gap which is flanked by wire coils within the pole piece of a magnetic circuit.

FIG. 2 is a front view of the magnet and armature included in FIG. 1.

FIG. 3 is a cross sectional view through the depth of the magnetic circuit taken along the plane 3-3 or FIG. 1.

DETAILED DESCRIPTION OF THE PREFERRED EMBODIMENTS

Figure 4:
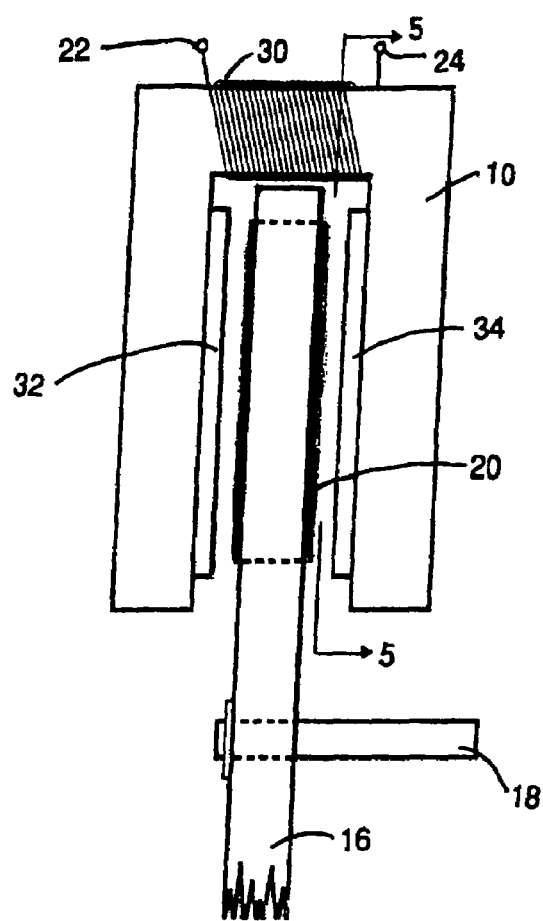
FIG. 4 is a side view, similar to FIG. 1, which illustrates an alternative embodiment of the invention.

In the ensuing description, the same or similar components in the various figures will be marked with the same reference numerals without repetition of the initial detailed identification of each component.

Referring to FIG. 1, this side view of an internal generator includes pole piece 10 having the shape of an inverted U. Within the space between the legs of the U are two coils of conductive wire 12, supported on layers 14 of nonconductive material. Preferably layer 14 is printed circuit board material with the conductive coils etched and printed, in one or more layers, thereon. These layers 14 are affixed to the interior surfaces of the legs of pole piece 10, for example, by adhesive or similar means.

Within the air gap flanked by the wire coils 2 is one segment of an armature 16, attached to a rotatable central shaft 18. Armature 16 supports at least one permanent magnet 20. The ends of the wire coils are connected to output terminals 22, 24 and 26, 28, respectively. Leads can be connected to output terminals 22-28 to conduct current from these terminals to input terminals of a battery, capacitor or other storage component of a cell phone, or other product or device, particularly where the device is portable and designed to be carried and used in various locations.

As will be evident to those skilled in the art, there is no physical connection between the wire coils 12 and armature 16. Therefore, the armature and its magnet 20 can be repeatedly and rapidly pivoted or completely rotated through the gap flanked by coils 12, whereby the magnetic flux in the gap will intersect the coils perpendicularly for optimum generation of electrical voltage and current therein by the Faraday Effect.

This freedom of the armature to fully rotate also means that multiple embodiments of mechanical drive systems, disclosed in applicants previously cited application for oscillating the coil wrapped armatures of that invention, are unnecessary in this invention. Instead, the armature 16 herein can be fully revolved by a simple handle driven crank linked to the shaft 18, or by a flywheel cranked up to free running speed by a hand driven clutch, as disclosed in the previous application.

Moreover, multiple magnets supported by multiple armatures linked to a central hub and shaft 18, with corresponding multiple magnetic circuits positioned to be successively traversed through their gaps by the magnets, can be installed in cell phones and other products to achieve extremely rapid self generation of electrical power within the housing of such products.

Figure 5:
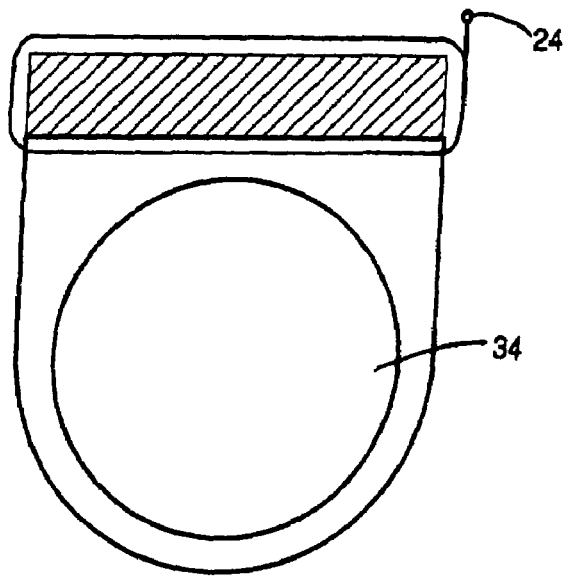
FIG. 5 is a cross sectional view, similar to FIG. 3, taken along the plane 5-5 of FIG. 4.

Referring to FIGS. 4 and 5, these illustrate an alternative embodiment of the present invention. As shown in FIG. 4, it includes a pole piece 10 made of iron or other paramagnetic material, armature 16, rotatable shaft 18 and permanent magnet 20. Preferably, paramagnetic materials of high relative permeability such as iron, nickel, cobalt or other ferromagnetic substances are used. A coil of insulated conductive wire 30 is wrapped around the entire length of the inverted base of pole piece 10.

Inwardly disposed bosses 32, 34 may be formed at the top and bottom of the interior surfaces of the legs of pole piece 10, which serve to concentrate the flux of magnet 20 and thus minimize flux leakage. Output terminals 22, 24 are disposed at opposite ends of wire coil 30.

In this embodiment, like that of FIGS. 1-3, there is no physical connection between armature 16 and wire coil 30. Therefore, the armature with its magnet 20 can be continuously revolved through the gap flanked by the legs of pole piece 10. The resulting magnetic flux in the gap is conducted by the legs of the pole piece perpendicularly through the wire coil 30 for efficient and optimum generation of electrical voltage and current in the coil. Also, as in the first embodiment, multiple armatures, magnets and pole pieces can be used for rapid and successive intersections of flux and conductive wire coils, which will aid in maximizing the self generation of electrical voltage and current, especially in portable devices like cell phones, including satellite phones, digital cameras, iPods, etc.

In the first embodiment of FIGS. 1-3, pole piece 10 can be made of non-magnetic material, for example, copper, since the wire coils 12 can be constructed to very closely flank the opposite poles of magnet 20 in the air gap between the pole piece legs. However, pole piece 10 can also be made of iron or other paramagnetic material to concentrate the magnetic flux within the air gap and minimize flux leakage.

In the second embodiment of FIGS. 4, 5, the pole piece 10 must be made of paramagnetic material in order to conduct the magnetic flux of magnet 20 perpendicularly through wire coil 30 wrapped around the inverted base or any other portion of the pole piece.

The invention has been described in terms of its functional principles and illustrative embodiments. Further details and preferences can be reviewed and applied in this invention from the applicant's previously cited earlier filed application. Many variations or modifications in the illustrative embodiments herein will be obvious to those studied in the art. Accordingly, it should be understood that all such variations and modifications are intended to be covered by the ensuing claims as well as all equivalents thereof

The invention claimed is:

1. A method of providing self-generation of electrical power in a generator and supplying it to a storage unit of a user portable electronic device which comprises:
    a) providing at least one armature that supports at least one permanent magnet within a housing of the device;
    b) providing at least one pole piece within the housing formed with an air gap which is flanked by at least one coil of conductive wire;
    c) imparting relative motion between the armature and the pole piece such that the permanent magnet passes through the air gap by oscillations in opposite swinging pendulum-like motions or rotations so that its magnetic flux is intersected by the wire coil to generate electrical voltage and current therein; and
    d) transmitting the electrical current to a storage component, said storage component and generator being user portable, and said armature being freely rotatable without hinderance from mechanical gears.

2. A method according to claim 1 which includes disposing an armature supporting two permanent magnets at its opposite ends and imparting relative motion between the armature and the pole piece such that each magnet passes through an air gap flanked by at least one coil of conductive wire.

3. A method according to claim 1 which includes disposing multiple armatures, multiple magnets and multiple coils of conductive wire in the generator, and imparting complete revolutions to the armatures such that the magnets successfully pass through air gaps to generate electrical voltage and current in multiple coils of conductive wire flanking each air gap.

4. A method according to claim 2 which includes disposing at least one pole piece comprising iron or other paramagnetic material and shaped approximately as an inverted U in the housing, wrapping the inverted base of the U with a coil of conductive wire, and imparting relative motion between the armature and the pole piece such that each magnet passes through an air gap flanked by the legs of the inverted U-shaped pole piece.

5. A method according to claim 1 wherein the portable electronic device is a portable communications device.

6. A method according to claim 5 wherein the portable communications device is a cell phone, a satellite phone, a digital camera or an iPod.

7. A method of providing capability of generation of electrical energy in a generator and supplying it to an energy storage unit of a user portable electronic device which comprises:
    a) providing at least one armature that supports at least one permanent magnet;
    b) providing at least one pole piece formed with an air gap which is flanked by at least one coil of conductive wire;
    c) imparting relative motion between the armature and the pole piece such that the permanent magnet passes through the air gap by oscillations in opposite swinging pendulum-like motions or rotations so that its magnetic flux is intersected by the wire coil to generate electrical energy therein;
    d) the motion of the armature being such that when the magnet passes through said air gap its relative motion is in a direction other than the direction of the axis of the poles of said magnet; and
    e) transmitting the electrical energy to said storage unit.

8. A method according to claim 7 wherein said motion of the magnet is substantially perpendicular to the pole axis of said magnet.

* * * * *